(12) United States Patent
Wang et al.

(10) Patent No.: US 10,818,021 B2
(45) Date of Patent: Oct. 27, 2020

(54) IMAGE PROCESSING METHOD, APPARATUS, AND STORAGE MEDIUM

(71) Applicant: ALIBABA GROUP HOLDING LIMITED, George Town, Grand Cayman (KY)

(72) Inventors: Bin Wang, Hangzhou (CN); Jingming Yu, Beijing (CN); Xiaoduan Feng, Hangzhou (CN); Pan Pan, Beijing (CN); Rong Jin, Sammamish, WA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 114 days.

(21) Appl. No.: 16/158,263

(22) Filed: Oct. 11, 2018

(65) Prior Publication Data

US 2019/0108646 A1    Apr. 11, 2019

(30) Foreign Application Priority Data

Oct. 11, 2017   (CO) .......................... 2017 1 0942829

(51) Int. Cl.
| | |
|---|---|
| G06K 9/00 | (2006.01) |
| G06T 7/40 | (2017.01) |
| G06T 15/04 | (2011.01) |
| G06T 19/00 | (2011.01) |
| G06T 17/05 | (2011.01) |
| G06T 7/70 | (2017.01) |
| G06F 16/583 | (2019.01) |

(52) U.S. Cl.
CPC ............ *G06T 7/40* (2013.01); *G06F 16/5862* (2019.01); *G06T 7/70* (2017.01); *G06T 15/04* (2013.01); *G06T 17/05* (2013.01); *G06T 19/003* (2013.01)

(58) Field of Classification Search
CPC ....... G06T 15/04; G06T 17/20; G06T 15/205; G06T 17/05; G06T 19/006; G06T 11/001; G06T 2207/10016
USPC ........................................................ 382/108
See application file for complete search history.

(56) References Cited

U.S. PATENT DOCUMENTS

| | | |
|---|---|---|
| 2006/0181549 A1 | 8/2006 | Alkouh |
| 2017/0155852 A1 | 6/2017 | von Cramon |
| 2019/0214148 A1* | 7/2019 | Voth ........................ G06T 19/20 |

OTHER PUBLICATIONS

PCT International Search Report issued in corresponding International Application No. PCT/US2018/055507, dated Jan. 16, 2019 (3 pages).

* cited by examiner

*Primary Examiner* — Charlotte M Baker
(74) *Attorney, Agent, or Firm* — Finnegan, Henderson, Farabow, Garrett & Dunner, LLP

(57) ABSTRACT

The present disclosure discloses an image processing method, apparatus, and a non-transitory computer readable medium. The method can includes: acquiring a three-dimensional (3D) model and original texture images of an object, wherein the original texture images are acquired by an imaging device; determining a mapping relationship between the 3D model and the original texture images of the object; determining, among the original texture images, a subset of texture images associated with a first perspective of the imaging device; splicing the subset of texture images into a spliced texture image corresponding to the first perspective; and mapping the spliced texture image to the 3D model according to the mapping relationship.

18 Claims, 6 Drawing Sheets

IMAGE PROCESSING METHOD, APPARATUS, AND STORAGE MEDIUM

CROSS REFERENCE TO RELATED APPLICATION

The disclosure claims the benefits of priority to Chinese application number 201710942829.7, filed Oct. 11, 2017, which is incorporated herein by reference in its entirety.

BACKGROUND

Three-dimensional (3D) texture mapping is widely used in various fields of computer graphics to increase the reality of 3D objects. The 3D texture mapping is a 3D image processing technology that can significantly improve the reality of 3D images. By using this technology, the misalignment of textures can be reduced, and the authenticity in observing objects from changed perspectives can be improved.

The existing 3D texture mapping is mostly completed using manual methods, for which it is difficult to guarantee the accuracy of 3D texture mapping and has a high time cost.

SUMMARY OF THE DISCLOSURE

Embodiments of the disclosure provide an image processing method. The method can include: acquiring a three-dimensional (3D) model and original texture images of an object, wherein the original texture images are acquired by an imaging device; determining a mapping relationship between the 3D model and the original texture images of the object; determining, among the original texture images, a subset of texture images associated with a first perspective of the imaging device; splicing the subset of texture images into a spliced texture image corresponding to the first perspective; and mapping the spliced texture image to the 3D model according to the mapping relationship.

Embodiments of the disclosure also provide an image processing apparatus. The apparatus can include: a memory storing a set of instructions; and at least one processor configured to execute the set of instructions to cause the image processing apparatus to acquire a three-dimensional (3D) model and original texture images of an object, wherein the original texture images are acquired by an imaging device; determine a mapping relationship between the 3D model and the original texture images of the object; determine, among the original texture images, a subset of texture images associated with a first perspective of the imaging device; splice the subset of texture images into a spliced texture image corresponding to the first perspective; and map the spliced texture image to the 3D model according to the mapping relationship.

Embodiments of the disclosure further provide a non-transitory computer readable medium that stores a set of instructions that is executable by at least one processor of a computer system to cause the computer system to perform an image processing method. The method can include: acquiring a three-dimensional (3D) model and original texture images of an object, wherein the original texture images are acquired by an imaging device; determining a mapping relationship between the 3D model and the original texture images of the object; determining, among the original texture images, a subset of texture images associated with a first perspective of the imaging device; splicing the subset of texture images into a spliced texture image corresponding to the first perspective; and mapping the spliced texture image to the 3D model according to the mapping relationship.

BRIEF DESCRIPTION OF THE DRAWINGS

In order to illustrate technical solutions in the embodiments of the present invention more clearly, the accompanying drawings needing to be used in the embodiments of the present invention will be briefly introduced in the following. Those of ordinary skill in the art can also obtain other accompanying drawings according to these accompanying drawings without creative efforts.

DETAILED DESCRIPTION

Figure 1:
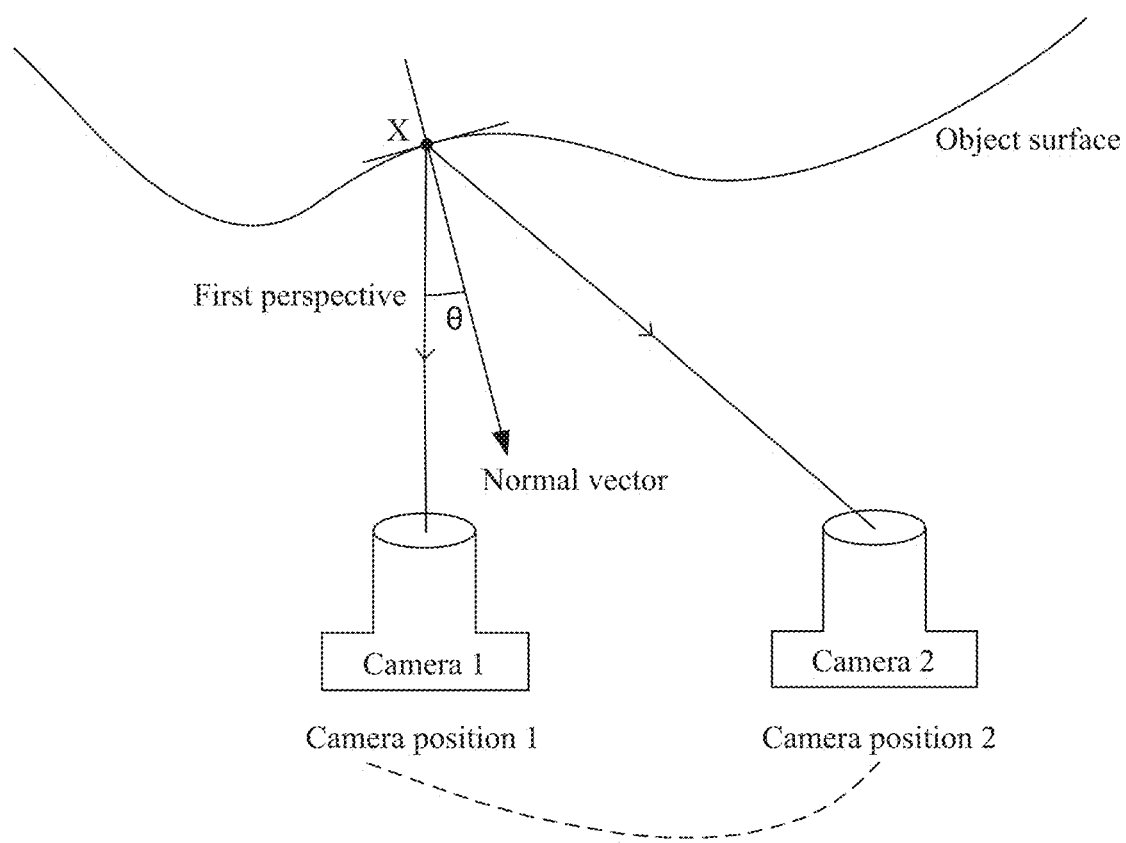
FIG. 1 is a schematic diagram of exemplary image processing from multiple shooting perspectives, according to embodiments of the present disclosure.

Features and exemplary embodiments in various aspects of the present disclosure are described in detail below. In order to make the objectives, technical solutions and advantages of the present disclosure more comprehensible, the present disclosure is described in further detail in the following with reference to the accompanying drawings and embodiments. It should be understood that specific embodiments described here are only configured to explain the present disclosure but are not configured to limit the present disclosure. For those skilled in the art, the present disclosure can be implemented without some details in these specific details. The following descriptions about the embodiments are merely intended to provide better understanding of the present disclosure by illustrating examples of the present disclosure.

It should be noted that in this text, the relative terms such as "first" and "second" are merely used to distinguish one entity or operation from another entity or operation, and do not require or imply that the entities or operations have this actual relation or order. Moreover, the terms "include", "comprise" or other variations thereof are intended to cover non-exclusive inclusion, so that a process, method, article or device including a series of elements not only includes the elements, but also includes other elements not clearly listed, or further includes elements inherent to the process, method, article or device. In the absence of more limitations, an element defined by "including a/an . . . " does not exclude that the process, method, article or device including the element further has other identical elements.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In embodiments of the present disclosure, an Augmented Reality (AR) technology can capture an image video of the real world by a camera terminal carried by the system itself and estimate a three-dimensional attitude of a virtual object in the image video by using a technology such as image registration. The AR technology can then place the virtual object or scene into a predetermined position in a real environment, and finally render the scene from the perspective of a camera lens. The three-dimensional attitude is used to describe 3D coordinates and a deflection angle of the object.

In embodiments of the present disclosure, a Virtual Reality (VR) technology is a computer simulation system in which a virtual world can be created and experienced. The system can use a computer to generate a simulation environment. The simulation environment includes multi-source information merging interactive 3D dynamic views and system simulation for physical behaviors, which can achieve immersive experience.

In the above embodiments, when a 3D scene needs to be used in the AR technology and the VR technology, several steps can be performed.

First, a 3D model of an object can be constructed. The 3D model of the object can be constructed in many ways.

In embodiments of the present disclosure, 3D modeling can be carried out on an actual object by using an instrument capable of performing 3D scanning, such as a 3D scanner. For example, the 3D scanner can be used to project structural light to an object in a real scene to acquire multiple pieces of point data of the object in the real scene. The point data can be used to construct point cloud data. A point cloud model can be constructed based on the point cloud data to implement modeling of a 3D configuration of the object and obtain a 3D model of the object. The point cloud data can include color information and depth information of the object as well as geometric position information represented with 3D coordinates. A 3D size of the object can be obtained according to the geometric position information of the object.

In embodiments of the disclosure, 3D reconstruction can be performed by using a video or pictures of an object to obtain a 3D model of the object.

In embodiments of the disclosure, the 3D model of the object can also be created using modeling software, such as 3D modeling, rendering and animation production software 3D Max, computer animation and modeling software Maya, or 3D modeling design software Meshmixer.

Second, 3D texture mapping can be carried out using the constructed 3D model of the object.

In some embodiments, when 3D modeling is carried out on an actual object by using a 3D scanner, 3D texture mapping can be carried out on the basis of an acquired point cloud model. For example, the point cloud model can be converted to a polygonal mesh model by surface reconstruction. Each polygon in the polygonal mesh model can uniquely determine a polygonal plane. Texture mapping from a texture image to a polygonal network model can be completed by affixing a texture in a texture image at a corresponding position to each polygon plane.

It is appreciated that establishment of the polygonal mesh model can be completed in various implementation manners. For example, the polygonal network model can be constructed in a manner of a triangle, a rectangle, a pentagonal, a hexagonal square-rhombus or the like. To simplify the description, an exemplary establishment manner of the polygon mesh model is illustrated in the following several embodiments using a triangular grid model as an example. However, the description cannot be interpreted as limiting the scope or implementation possibility of the solution, and a processing method for other polygonal mesh models other than the triangular grid model is consistent with the processing method for the triangular grid model.

In some embodiments, point cloud data of a point cloud model can be triangulated to obtain the triangular grid model. Each triangle in the triangular grid model can uniquely determine a plane (such as, a triangular patch). It is appreciated that patches in another shape can be determined using other grid models. Texture mapping from a texture image to a triangular network model can be completed by affixing a texture in a texture image at a corresponding position to each triangular patch.

It is appreciated that a texture image for an object can be obtained in many ways. For example, a pre-stored general texture image (e.g., a metal texture image template, a wood texture image template, etc.), a texture image prepared for an object in advance (e.g., pre-collected), and a surface image of an object captured in real time (e.g., collected by a real-time collection device). In embodiments of the present disclosure, the texture in the text image can include information such as scene color and scene brightness.

In some embodiments, the point cloud model and the triangular grid model can be different presentation forms of the 3D model, which is constructed according to a 3D scene at different stages in the process of carrying out 3D texture mapping. In the following description of embodiments of the present disclosure, the triangular grid model can be referred to as a 3D grid model.

According to the image processing method in embodiment of the present disclosure, when 3D texture mapping is carried out, a corresponding texture can be affixed to each triangular patch in a 3D model according to a mapping relationship between a texture image and the 3D model.

In embodiments of the present disclosure, an image of a target modeling object can be collected by using an imaging device, so that original textures in the image of the target modeling object can be further obtained according to the collected image of the target modeling object.

In some embodiments, the imaging device can include a camera, a video camera, etc.

The imaging device can collect an image of the target modeling object based on the same imaging principle to obtain textures in the image of the target modeling object. Establishment of a mapping relationship between a 3D model on which texture mapping is to be carried out and a texture image according to parameters of the imaging device will be introduced by using a camera as an example of the imaging device.

FIG. 1 is a schematic diagram of exemplary image processing from multiple shooting perspectives, according to embodiments of the present disclosure. A method for establishing a corresponding relationship between a 3D model of an object and a texture image according to parameters of an imaging device will be described in detail with reference to FIG. 1.

As shown in FIG. 1, for example, it is possible to shoot an object by using the same camera at different camera positions surrounding the object and by changing parameters of the camera.

As another example, it is also possible to place a certain number of cameras at positions surrounding the object, so as to shoot the object respectively with the cameras at different positions to collect images of the object.

Photos can be taken by surrounding an actual object and adjusting camera parameters. The camera parameters include internal camera parameters and external camera parameters. The internal camera parameters are parameters related to characteristics of a camera, for example, a camera focus, pixel size, an optic center position, etc. The external camera parameters are parameters of the camera in the global coordinate system including, for example, camera position and rotation direction. That is, the external camera parameters can determine position parameters and the orientation of the camera in a 3D space.

To determine a position relationship between a surface feature point of a spatial object and a corresponding point of the feature point in a texture image, a geometric model of camera imaging can be established. The geometric model can be expressed as camera parameters. A mapping relationship between a 3D coordinate system used by the spatial object and a camera image coordinate system used by the texture image can be determined according to the camera parameters. Points in a 3D space can be mapped to an image space according to the camera parameters, or points in an image space can be mapped to a 3D space.

In some embodiments, the motion of an object in a 3D scene can be expressed as rigid body motion. During the motion, the object will not be deformed, and the motion only contains rotation and translation. The rotation part can be referred to as a rotation component, and the panning part can be referred to as a displacement component.

According to a pinhole camera imaging model, 3D points in a real scene can be mapped to 2D points on an image through projection transformation, and the transformation process can be expressed as:

$$p=K[Rt]P \quad (1)$$

In the above formula (1), P represents a 3D coordinate of a feature point on the object in a real scene, matrix K represents an internal parameter matrix of a camera lens focus and an imaging focus. [R t] is a 3×4 matrix formed by extension according to a 3D attitude of the object, R represents a rotation component, a 3×3 matrix is used to represent a rotation direction of a virtual object in an AR system, and t represents a displacement component. A coordinate of the object in a 3D scene can be represented by a matrix $[x\ y\ z\ 1]^T$, and $p=[x\ y\ 1]^T$ is a 2D homogeneous pixel coordinate of a corresponding point of the feature point on the image.

By using the above formula (1) or using models reflecting formula (1), a mapping relationship between a 3D coordinate of the object in a 3D scene and a 2D point coordinate on the image can be established (i.e., a mapping relationship between a 3D model and a texture image). The matrix [R t] can be referred to as an external camera parameter.

Through the image processing method in the above embodiment, a 3D model of an object can be established by using an imaging device, and a mapping relationship between the 3D model and a texture image of the object is established based on parameters of the imaging device.

In FIG. 1, when an object is shot by an imaging device (e.g., a camera) to collect an image of the object, there is a beam of ray that can be vertically incident to a camera lens in reflected light of a patch on the surface of a shot object. The ray vertically incident to the camera lens is referred to as an incident ray of the camera lens.

Further referring to FIG. 1, an extension line of the incident ray of the camera lens and the patch on the surface of the shot object form an intersection point X. The intersection point X can be used as a camera shooting viewpoint from which the camera shoots the patch.

When the camera is located at a camera position 1, an included angle between a connecting line (i.e., an incident ray of the camera) of the camera and a viewpoint and a normal vector of the patch where the viewpoint is located can be used as a shooting perspective when the camera collects an object image at camera position 1.

When the camera is used to shoot a patch on the surface of an object, a clear image of the patch on the surface of the object can be obtained if the shooting perspective meets a certain included angle limiting condition, and thus a clear texture of the patch on the surface of the object can be obtained.

In embodiments of the disclosure, the shooting perspective that meets the included angle limiting condition can be used as a first perspective from which the camera shoots the patch on the surface of the object.

For example, the included angle limiting condition can be that the included angle between the connecting line of the camera and the viewpoint and the normal vector of the patch where the viewpoint is located is less than a preset included angle threshold, for example, 45° or 30°. The smaller preset included angle threshold results in higher quality of images obtained by shooting as well as their textures.

As images shot by the camera involve different shooting positions, shooting perspectives, image color differences, and illumination differences between the different shooting perspectives, several operations can be performed on original texture images to achieve a better splicing effect. The original texture images are shot by the camera and have not been processed. The operations can include analyzing shooting perspectives, balancing color differences and illumination differences between the different shooting perspectives, and optimizing seams, and the like. It is difficult to perform the above operations by using conventional 2D image splicing technology, and manually performing the operations has a high time cost, and it is difficult to guarantee the accuracy.

Therefore, embodiments of the present disclosure provide an image processing method, apparatus, system and a storage medium, which can save manpower and time cost and improve the accuracy of texture mapping.

The process of carrying out texture mapping on a 3D model of an object by using an image processing method will be described in detail with reference to FIG. 2.

Figure 2:
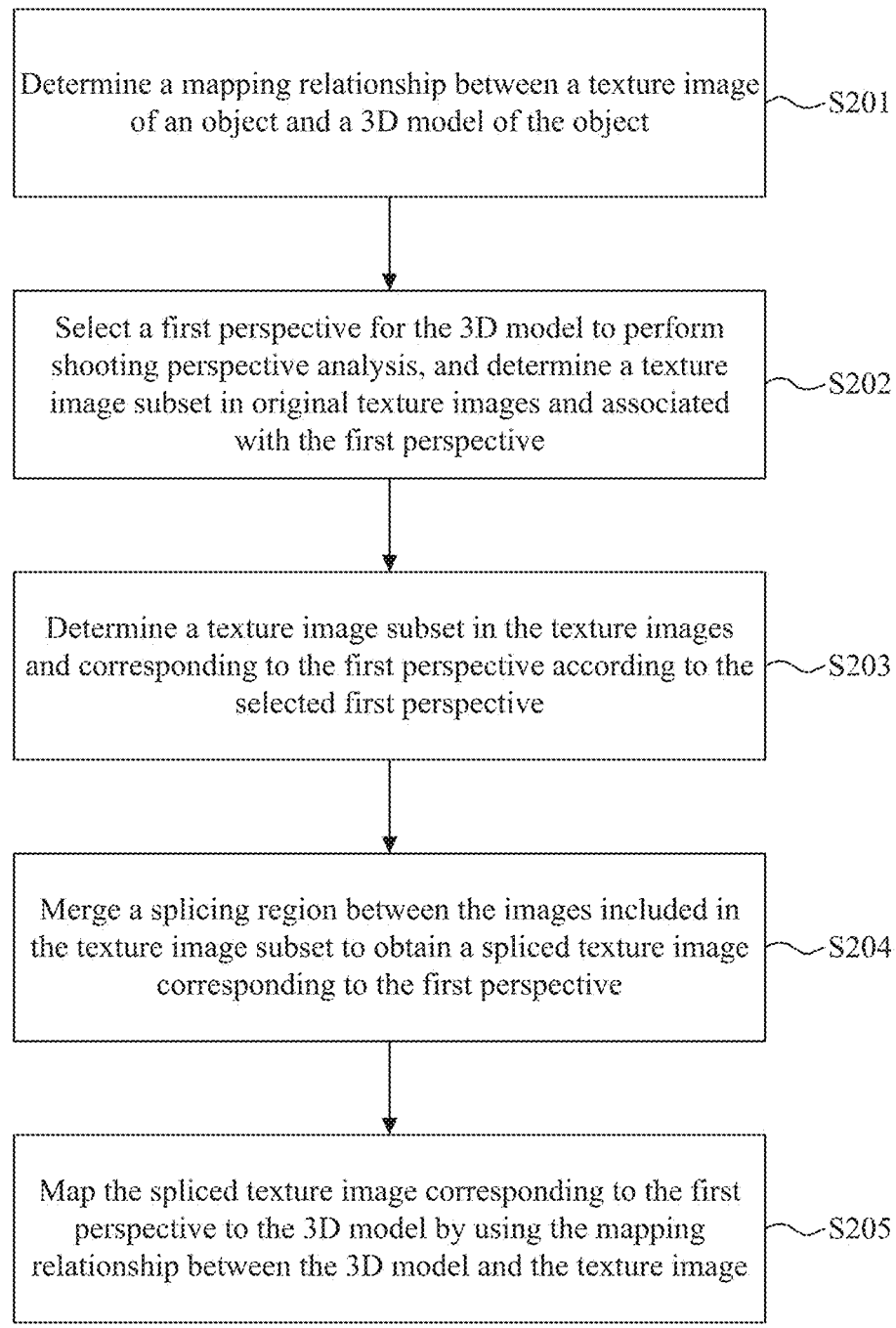
FIG. 2 is a flowchart of an exemplary image processing method, according to embodiments of the present disclosure.

FIG. 2 is a flowchart of an exemplary image processing method 200, according to embodiments of the present disclosure. As shown in FIG. 2, image processing method 200 can include steps S201-S205.

In step S201, a mapping relationship between a texture image of an object and a 3D model of the object can be determined. For example, the mapping relationship between the texture image and the 3D model can be determined based on above formula (1).

In step S202, a first perspective for the 3D model can be selected to determine a subset of texture images in original texture images that is associated with the first perspective. In this step, the first perspective for the 3D model can be selected using two sub-steps.

In a first sub-step, a normal vector of a triangular patch in the 3D model can be determined. In embodiments of the present disclosure, a normal is a vertical line that reaches a triangular patch of the 3D model, and the normal is a vector, thus being referred to as a normal vector. The normal vector of the triangular patch can be obtained by determining an outer product of two vectors of the triangular patch according to the two vectors.

In some embodiments, three vertices of each triangular patch are denoted as pt1, pt2 and pt3, respectively. Two vectors of the triangular patch are a connection line vector between the point pt1 to the point pt2 and a connection line vector between the point pt2 to the point pt3.

For example, the normal vector of the triangular patch in the 3D model can be determined based on the following formula (2):

$$\text{Normal}_{face} = \text{Vect}_{pt1 \to pt2} \times \text{Vect}_{pt2 \to pt3} \qquad (2)$$

In the above formula (2), $\text{Vect}_{pt1 \to pt2}$ represents a connection line vector between the point pt1 to the point pt2, $\text{Vect}_{pt2 \to pt3}$ represents a connection line vector between the point pt2 to the point pt3, and $\text{Vect}_{pt1 \to pt2} \times \text{Vect}_{pt2 \to pt3}$ represents the outer product of $\text{Vect}_{pt1 \to pt2}$ and $\text{Vect}_{pt2 \to pt3}$, so as to obtain a vector perpendicular to the two vectors, that is, a normal vector $\text{Normal}_{face}$ of the triangular patch.

In a second sub-step, a first perspective shooting the triangular patch of the 3D model can be determined. In embodiments of the disclosure, when a shooting position of the imaging device directly faces the triangular patch of the 3D model, it is considered that a shot texture image of the triangular patch of the 3D model at the shooting position of the camera is clear.

In some embodiments, a normal vector of a triangular patch of the 3D model can be used as a first normal vector. A current position of the camera is acquired, and when an included angle between an incident ray of the camera at the current position and the first normal vector meets an included angle limiting condition, the included angle that meets the included angle limiting condition is used as a first perspective of the 3D model.

For example, the included angle limiting condition is that the included angle between the incident ray of the camera at the current position and the first normal vector is less than or equal to 45°. In this example, when the shooting position of the camera directly faces the triangular patch of the 3D model, the first perspective for the 3D model is 0°.

In step S203, a subset of texture images corresponding to the first perspective in the texture images can be determined according to the selected first perspective. In embodiments of the present disclosure, the texture image corresponding to the first perspective can be used as the subset of texture images, to obtain a clear texture image of the triangular patch.

In this step, borders of images included in each subset of texture images can be determined according to the images included in the subset of texture images, so as to determine an overlapping region between the images included in the subset of texture images. The overlapping region can be used as a splicing region between the images included in the subset of texture images. For example, the splicing region between the images included in the subset of texture images can be determined through a Markov random field algorithm. For example, the image segmentation method in embodiments of the present disclosure can be one or more of a region growing algorithm, a flood fill algorithm, and a graph cut algorithm.

The flood fill algorithm for determining connected regions in a multi-dimensional space can be used for region filling or region color replacement in a texture image. The flood fill algorithm can select a feature point from the texture image as a seed point. Starting from the seed point, the flood fill algorithm uses a certain rule to judge whether a pixel point around the seed point is consistent with or similar to the seed point, so as to determine whether the point belongs to a filling region where the seed point is located, thus realizing region filling or extending of the image.

The region growing algorithm can segment an image according to pixel similarity and connectivity of pixels between alternative texture images. The graph cut algorithm can segment an image based on a color statistical sampling method.

In step S04, the splicing region between the images included in the subset of texture images can be merged to obtain a spliced texture image corresponding to the first perspective. In embodiments of the present disclosure, when a shooting angle for the 3D model meets an included angle limiting condition, it is considered that a texture image acquired at the camera position has better sharpness. Therefore, a sharpness function of the images included in the subset of texture images can be constructed. Selection can be performed on a relationship between sharpness of the images included in the subset of texture images and the shooting perspective based on the sharpness function.

In embodiments of the present disclosure, an original texture image can be segmented according to a shooting angle. If the area of the splicing region of the images included in the obtained subset of texture images can be minimized, the integrity of a texture image acquired from the shooting perspective can be improved.

Therefore, an integrity function of the images included in the subset of texture images can be constructed by using an area of a projection of the splicing region among the images included in the subset of texture images on a patch to be processed. The integrity function can be obtained by determining a relationship between integrity of the images included in the subset of texture images and an area of the splicing region.

In some embodiments, gradient optimization can be carried out on the images included in the subset of texture images based on the sharpness function and the integrity function.

In some embodiments, a neural network for merging the images included in the subset of texture images can be represented based on the following formula (3):

$$E = \min(E_{data} + E_{smooth}) \qquad (3)$$

In the above formula (3), $E_{data}$ represents a sharpness function of the images included in the subset of texture images, and $E_{smooth}$ represents an integrity function of the images included in the subset of texture images. The images included in the subset of texture images are merged by using $E_{data}$ and $E_{smooth}$ to obtain images included in the subset of texture images that have relatively high sharpness and integrity. The sharpness function and the integrity function can be associated with, for example, Markov Random Field, and be defined in various forms corresponding to application scenarios.

According to the image processing method in embodiments of the present disclosure, a texture image having high sharpness and integrity can be obtained by constructing a neural network for merging images included in a subset of texture images and training the neural network according to a shooting perspective and an area of a splicing region.

In step S05, the spliced texture image corresponding to the first perspective can be mapped to the 3D model by using the mapping relationship between the 3D model and the texture image. The spliced texture image can be mapped to a position of the 3D model based on the mapping relationship between the 3D model and the texture image, so as to implement 3D texture mapping for the 3D model. For example, the first perspective is iteratively calculated in the process of mapping the spliced texture image to the 3D model, so as to obtain a plurality of spliced texture images, until a texture model of the 3D model is obtained.

In some embodiments, the image processing method can further include a step S06. In step S06, light equalization processing is performed on the texture model by using image editing and merging technology to obtain a texture model with uniform light.

In some embodiments, gradients of pixels in the images included in the subset of texture images are maintained, differences such as color differences between images in the splicing region and the images included in the subset of texture images are smoothly dispersed into an entire image consisting of the images included in a plurality of subset of texture images by using a Poisson equation-based algorithm of the image editing and merging technology, so that the splicing region between the images included in the subset of texture images is imperceptible and the hue and illumination of the images at the splicing region are consistent with those of the entire image. Accordingly, the images included in the subset of texture images achieve a global light equalization effect, and texture mapping with uniform light is obtained, so that the 3D model after texture mapping has a desirable visual effect.

According to the image processing method in the embodiments of the present disclosure, a shooting perspective for a 3D model can be selected, a texture image can be segmented and texture-blended based on the selected shooting perspective to obtain texture mapping with a high quality, and manpower cost can be saved significantly at the same time.

A specific implementation manner of the image processing method is described in the following with reference to FIG. 3 by taking as an example that the specific object is a sculpture. It should be understood that the description should not be interpreted as limiting the scope or implementation possibility of the solution, and an image processing method for a specific object other than the sculpture is consistent with the specific implementation manner of the image processing method described with reference to FIG. 3.

Figure 3:
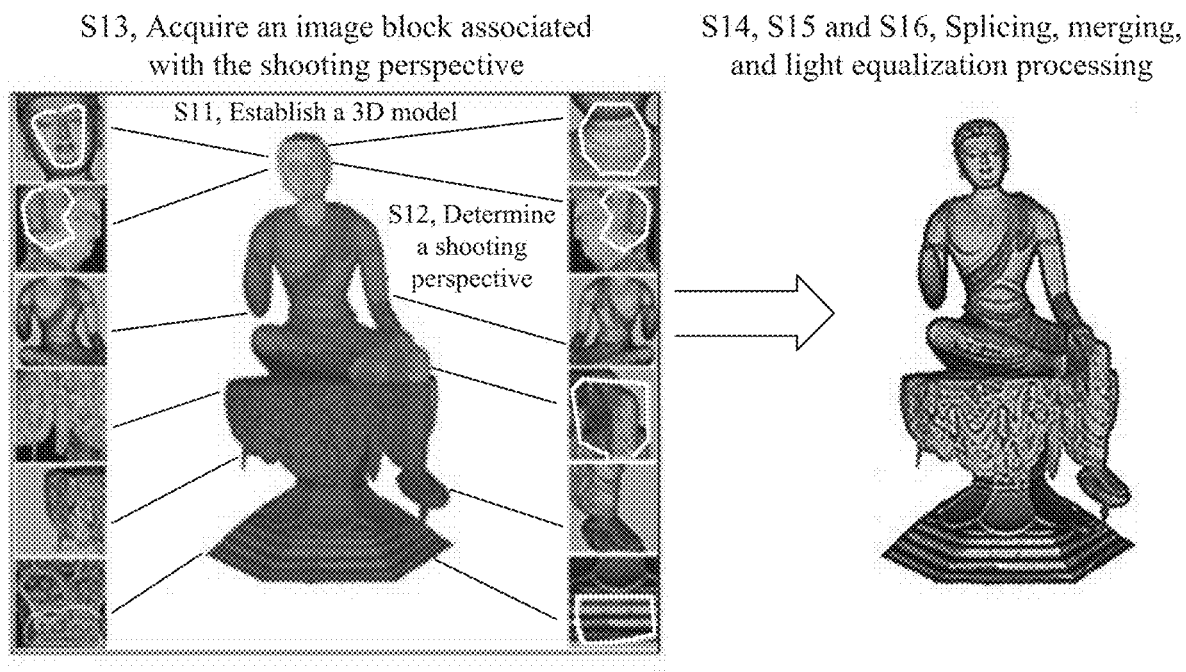
FIG. 3 is a schematic diagram of a processing procedure of an exemplary image processing method, according to embodiments of the present disclosure.

FIG. 3 is a schematic diagram of a processing procedure of an exemplary image processing method, according to embodiments of the present disclosure. Effects of the processing procedure of an image processing method can be schematically shown with reference to FIG. 3 and the image processing method according to embodiments of the present disclosure.

In an exemplary embodiment, the image processing method can include the following steps S11-S16.

As shown in step S11 in FIG. 3, a 3D model of a sculpture can be constructed. In this step, according to the method for constructing a 3D model of an object in the above embodiment of the present disclosure, 3D modeling can be performed on the sculpture by modeling software. For example, 3D modeling can be performed on the sculpture by using modeling software, such as 3D model design software Meshmixer, to obtain a 3D model 10 of the sculpture. In this example, the 3D model 10 of the sculpture can be a polygonal mesh model.

As shown in step S12 in FIG. 3, a shooting perspective for the 3D model of the sculpture can be determined. In this step, the determined shooting perspective for the 3D model of the sculpture can be taken as a first perspective for the 3D model of the sculpture. By using the method for selecting a first perspective for a 3D model in the above embodiment, a first perspective that meets an included angle limiting condition in the embodiment of the present disclosure is obtained.

For example, as shown in FIG. 3, when an included angle between a connecting line of an imaging device (not shown in the figure) and a shooting viewpoint and a normal vector of a polygonal patch of the 3D model meets an included angle limiting condition in the embodiment of the present disclosure, the included angle is selected to serve as the shooting perspective for the 3D model of the sculpture.

As a specific example, the first perspective can be a shooting angle less than or equal to 45 degrees, for example, 0 degrees. When the first perspective is 0 degrees, it indicates that the imaging device directly faces the polygonal patch of the 3D model.

As shown in step S13 in FIG. 3, a subset of texture images in the texture images and associated with the selected shooting perspective is acquired. In FIG. 3, a spliced texture image block 20 schematically shows a subset of texture images in the texture images that are associated with the first perspective. As shown in FIG. 3, when the selected shooting perspective meets an included angle limiting condition in the embodiment of the present disclosure, a relatively clear subset of texture images associated with the first perspective can be obtained.

As shown by S14, S15 and S16 in FIG. 3, texture blending and texture image mapping can be carried out on the splicing region, and light equalization processing is performed on a texture model after the texture image mapping.

In some embodiments, in step S14, a splicing region between the images included in the subset of texture images that are associated with the shooting perspective is determined, and the splicing region is texture-blended.

For example, the images included in the subset of texture images can be merged by using a neural network for merging the images included in the subset of texture images based on the above formula (3), to obtain the images included in the subset of texture images with relatively high sharpness and integrity.

In some embodiments, a plurality of spliced texture image blocks 20 can be obtained by iteratively calculating the first perspective multiple times. A merged texture image with relatively high sharpness and integrity can be obtained by texture-blending a splicing region between the plurality of spliced texture image blocks 20.

In some embodiments, in step S15, the merged texture image can be mapped to the 3D model by using the mapping relationship between the 3D model of the sculpture and the texture image of the sculpture, to obtain a texture model of the 3D model of the sculpture.

In some embodiments, in step S16, light equalization processing can be performed on the texture model by using the image editing and merging technology in the above embodiment of the present disclosure, to obtain a texture model with uniform light.

In FIG. 3, the texture model with uniform light obtained by light equalization processing is schematically illustrated through a 3D texture model 30. After the light equalization processing, the 3D model after texture mapping has a desirable visual effect.

In some embodiments, the entire image processing procedure does not require manual participation and saves the time cost by using an automatic 3D texture mapping method, such that the sculpture entity presents a more real visual effect, the accuracy and aesthetic degree of 3D texture mapping are improved, and the time cost is saved.

Figure 4:
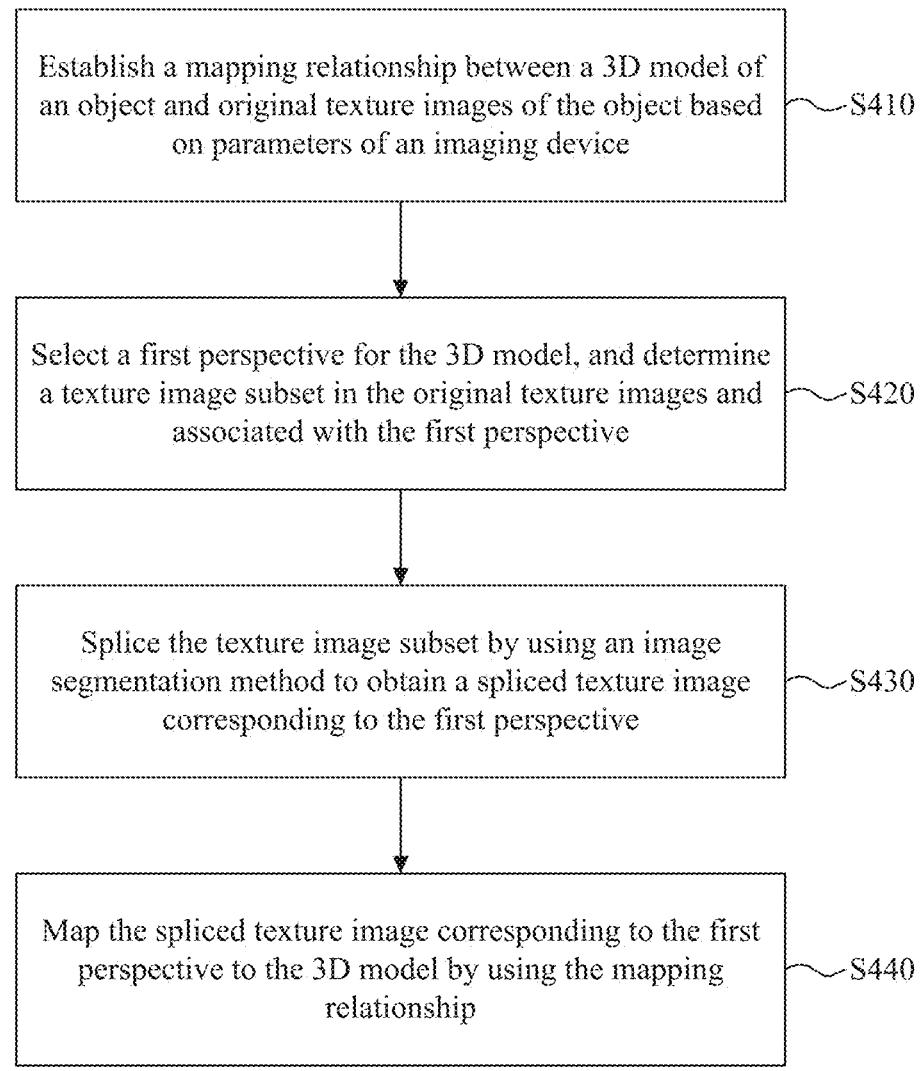
FIG. 4 is a flowchart of another exemplary image processing method, according to embodiments of the present disclosure.

FIG. 4 is a flowchart of another exemplary image processing method, according to embodiments of the present disclosure. As shown in FIG. 4, the image processing method 400 includes the following steps S410-S440.

In step S410, a mapping relationship between a 3D model of an object and original texture images of the object can be established based on parameters of an imaging device. In some embodiments, the mapping relationship between the 3D model and the original texture images can be established based on formula (1).

In step S420, a first perspective for the 3D model can be selected, and a subset of texture images in the original texture images that is associated with the first perspective can be determined.

In some embodiments, step S420 can include the following steps S421-S423. In step S421, a polygonal patch of the 3D model as a patch to be processed can be acquired, and a normal vector of the patch to be processed can be obtained. In step S422, when an included angle between a connecting line of the imaging device and the shooting viewpoint and the normal vector of the patch to be processed can meet a threshold condition, the included angle is taken as the first perspective of the 3D model. In step S423, images in the original texture images and corresponding to the first perspective of the imaging device can be taken as a subset of texture images associated with the first perspective.

A subset of texture images associated with the first perspective can be determined through the above steps S421 to S423. Images included in the subset of texture images associated with the first perspective have relatively high sharpness.

In step S430, the subset of texture images can be spliced by using an image segmentation method to obtain a spliced texture image corresponding to the first perspective.

In some embodiments, step S430 can include the following steps S431 and S432.

In step S431, an overlapping region between images included in the subset of texture images can be taken as a splicing region between the images included in the subset of texture images using the image segmentation method.

In step S432, the splicing region between the images included in the subset of texture images can be texture-blended to obtain the spliced texture image corresponding to the first perspective.

In an embodiment, step S432 can further include the following steps Step S432-01, Step S432-02, and Step S432-03.

In step S432-01, a sharpness function of the images included in the subset of texture images can be constructed, and selection optimization can be performed on a relationship between sharpness of the images included in the subset of texture images and the first perspective based on the sharpness function.

In step S432-02, an integrity function of the images included in the subset of texture images can be constructed, the integrity function being obtained by determining a relationship between integrity of the images included in the subset of texture images and an area of the splicing region.

In step S432-03, gradient optimization can be performed on the images included in the subset of texture images based on the sharpness function and the integrity function, so that the splicing region between the images included in the subset of texture images is texture-blended to obtain the spliced texture image corresponding to the first perspective.

For example, it is possible to construct, based on the above formula (3), a neural network model for merging a splicing region between the images included in the subset of texture images, and train the neural network model by using the sharpness function and the integrity function jointly as training functions of the neural network model, so as to texture-blend the splicing region between the images included in the subset of texture images, thus guaranteeing the accuracy of 3D texture mapping.

In step S440, the spliced texture image corresponding to the first perspective can be mapped to the 3D model by using the mapping relationship.

In some embodiments, the image processing method 400 can further include: iteratively determining the first perspective multiple times in the process of mapping the spliced texture image to the 3D model so as to obtain a plurality of spliced texture images, until a complete texture model of the 3D model is obtained.

In some embodiments, the image processing method 400 can further include: performing light equalization processing on the texture model by using image editing and merging technology to obtain a texture model with uniform light.

In some embodiments, texture mapping with uniform light can be obtained after the global light equalization processing, so that the 3D model after texture mapping has a desirable visual effect.

According to the image processing method, the entire processing procedure does not require manual participation, improves the accuracy and aesthetic degree of 3D texture mapping, and saves time costs.

An image processing apparatus according to embodiments of the present disclosure is introduced in detail in the following with reference to the accompanying drawings.

Figure 5:
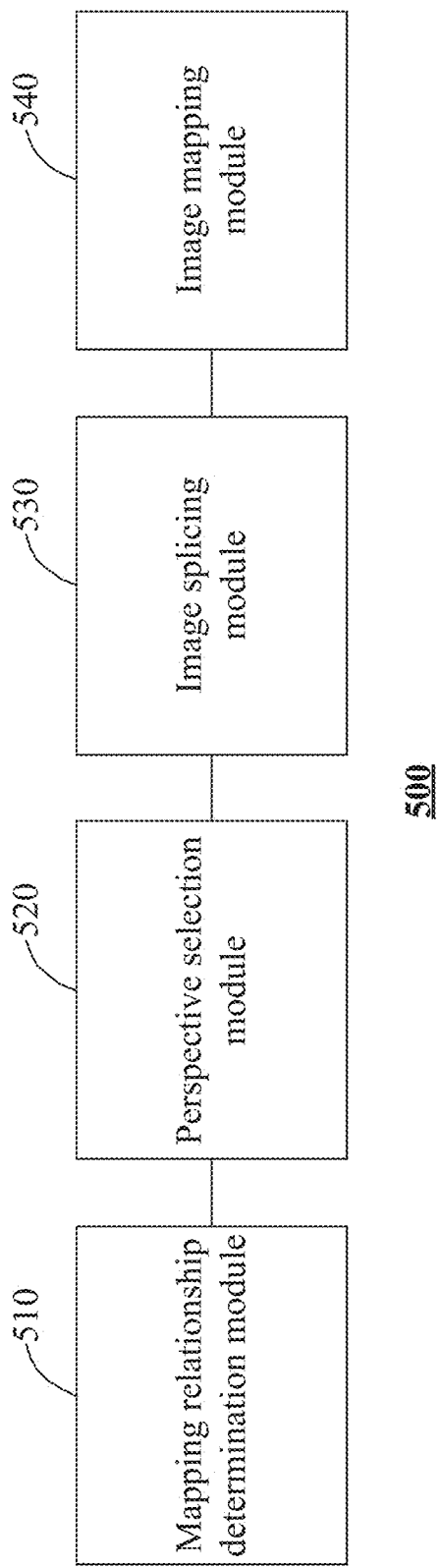
FIG. 5 is a schematic structural diagram of an exemplary image processing apparatus, according to embodiments of the present disclosure.

FIG. 5 is a schematic structural diagram of an exemplary image processing apparatus, according to embodiments of the present disclosure. As shown in FIG. 5, the image processing apparatus 500 can include: a mapping relationship determination module 510, a perspective selection module 520, an image splicing module 530, and an image mapping module 540.

Mapping relationship determination module 510 can be configured to determine a 3D model of an object and a mapping relationship of original texture images of the object acquired through an imaging device.

Perspective selection module 520 can be configured to select a first perspective for the 3D model, and determine a subset of texture images in the original texture images that is associated with the first perspective.

Image splicing module 530 can be configured to splice the subset of texture images by using an image segmentation method to obtain a spliced texture image corresponding to the first perspective.

Image mapping module 540 can be configured to map the spliced texture image corresponding to the first perspective to the 3D model by using the mapping relationship.

According to the image processing apparatus, the accuracy of 3D texture mapping can be improved, and the time cost is saved.

In some embodiments, perspective selection module 530 can further include: a normal vector determination unit, a first perspective determination unit, and a subset of texture images acquisition unit.

The normal vector determination unit can be configured to acquire a polygonal patch of the 3D model as a patch to be processed, and obtain a normal vector of the patch to be processed;

The first perspective determination unit can be configured to take, when an included angle between an incident ray of the imaging device and the normal vector of the patch to be processed meets a threshold condition, the included angle as the first perspective of the 3D model; and The subset of texture images acquisition unit can be configured to take images in the original texture images and corresponding to the first perspective of the imaging device as a subset of texture images associated with the first perspective.

In some embodiments, the perspective selection module can automatically analyze shooting perspectives of a shooting position of the imaging device, determine a shooting perspective that meets an included angle limiting condition, and can obtain a clearer subset of texture images corresponding to the selected shooting perspective according to the selected shooting perspective.

In some embodiments, the image splicing module 540 can further include: a splicing region determination module and a texture blending module.

The splicing region determination module can be configured to take, by using the image segmentation method, an overlapping region between images included in the subset of texture images as a splicing region between the images included in the subset of texture images; and The texture blending module can be configured to texture-blend the splicing region between the images included in the subset of texture images to obtain the spliced texture image corresponding to the first perspective.

In some embodiments, the texture blending module can further include: a sharpness function construction unit, an integrity function construction unit, and a gradient optimization unit.

The sharpness function construction unit can be configured to construct a sharpness function of the images included in the subset of texture images, and perform selection optimization on a relationship between sharpness of the images included in the subset of texture images and the first perspective based on the sharpness function.

The integrity function construction unit can be configured to construct an integrity function of the images included in the subset of texture images, the integrity function being obtained by calculating a relationship between integrity of the images included in the subset of texture images and an area of the splicing region.

The gradient optimization unit can be configured to perform gradient optimization on the images included in the subset of texture images based on the sharpness function and the integrity function, so that the splicing region between the images included in the subset of texture images is texture-blended to obtain the spliced texture image corresponding to the first perspective.

To obtain a complete 3D texture model, the image processing apparatus 500 is further configured to: iteratively determine the first perspective multiple times in the process of mapping the spliced texture image to the 3D model so as to obtain a plurality of spliced texture images, until a complete texture model of the 3D model is obtained.

In some embodiments, the image processing apparatus 500 can further include: a light equalization module configured to perform light equalization processing on the texture model by using image editing and merging technology to obtain a texture model with uniform light.

In some embodiments, after light equalization processing is performed on the 3D texture model, the 3D model after 3D texture mapping can have a desirable visual effect and enhanced user visual experience.

Other details of the image processing apparatus according to the embodiment of the present disclosure are similar to those in the image processing method according to the embodiment of the present disclosure described above with reference to FIG. 1, which are not repeated here.

Figure 6:
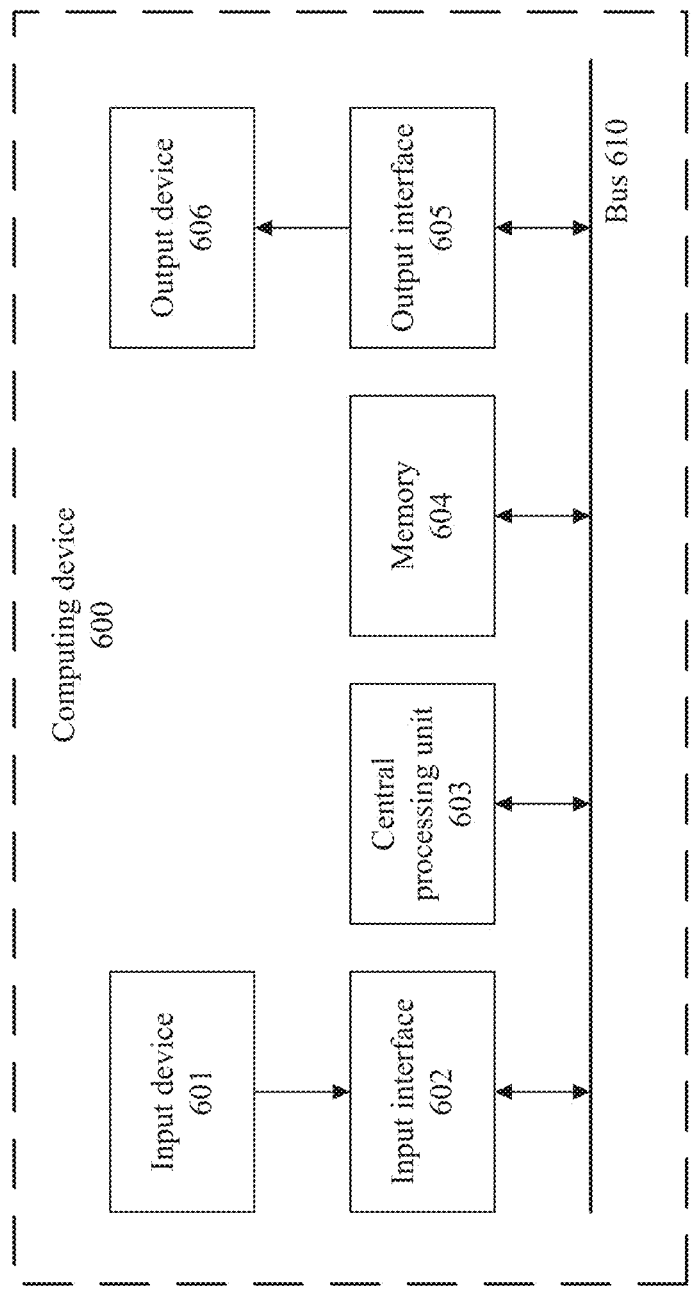
FIG. 6 is a structural diagram of exemplary hardware architecture of a computing device capable of implementing an image processing method and apparatus, according to embodiments of the present disclosure.

FIG. 6 is a structural diagram of exemplary hardware architecture of a computing device capable of implementing an image processing method and apparatus, according to embodiments of the present disclosure.

As shown in FIG. 6, the computing device 600 includes an input device 601, an input interface 602, a central processing unit 603, a memory 604, an output interface 605, and an output device 606. The input interface 602, the central processing unit 603, the memory 604, and the output interface 605 are connected to each other through bus 610. The input device 601 and the output device 606 are connected to the bus 610 respectively through the input interface 602 and the output interface 605, so as to be connected to other components of the computing device 600.

For example, the input device 601 receives input information from the outside (e.g., an imaging device) and transmits the input information to the central processing unit 603 through the input interface 602. The central processing unit 603 processes the input information based on a computer executable instruction stored in the memory 604 to generate output information, stores the output information temporarily or permanently in the memory 604, and then transmits the output information to the output device 606 through the output interface 605. The output device 606 outputs the output information to the outside of the computing device 600 for users to use.

In other words, the computing device shown in FIG. 6 can also be implemented as an image processing system. The image processing system includes a memory storing a computer executable instruction; and a processor, wherein the image processing method and apparatus described with reference to FIG. 1 to FIG. 5 can be implemented when the processor executes the computer executable instruction. Here, the processor can communicate with an imaging device to execute the computer executable instruction based on related information from image processing, thus implementing the image processing method and apparatus described with reference to FIG. 1 to FIG. 5.

Embodiments of the present disclosure propose an efficient, full-automatic and high-quality image processing method, which can significantly save the manpower cost while guaranteeing the quality of 3D texture mapping.

The above embodiments can be wholly or partially implemented by software, hardware, firmware or any combinations of them. When implemented by software, the embodiments can be implemented wholly or partially in a form of a computer program product or computer readable storage medium (e.g., memory 604 or another memory component). The computer program product or computer readable storage medium includes one or more computer instructions. When the computer program instruction is loaded and executed on a computer (e.g., by central processing unit 603 of a computer), the procedures or functions according to the embodiments of the present disclosure are wholly or partially generated. The computer can be a computer, a computer network, or another programmable device. The computer instruction can be stored in the computer readable storage medium or transmitted from one computer readable storage medium to another computer readable storage medium. For example, the computer instruction can be transmitted from one website, computer, server or data center to another website, computer, server or data center in a wired (e.g., a coaxial cable, an optical fiber, or a digital subscriber line (DSL)) or wireless (e.g., infrared, radio, microwave or the like) manner. The computer readable storage medium can be any available medium accessible by a computer or a data storage device that includes a server or a data center integrated by one or more available media. The available medium can be a magnetic medium (e.g., floppy disk, hard disk, or magnetic tape optical medium (e.g., DVD), a semiconductor medium (e.g., a Solid State Disk (SSD)), etc. Moreover, the computer readable storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

It should be clarified that the present disclosure is not limited to the specific configuration and processing described above and shown in the figures. A detailed description about a known method is omitted here for brevity. Several specific steps are described and shown as examples in the above embodiments. However, the procedure of the method of the present disclosure is not limited to the specific steps described and shown, and those skilled in the art can make various changes, modifications and additions or change the sequence between the steps after comprehending the spirit of the present disclosure.

The above descriptions are merely specific implementation manners of the present disclosure. Those skilled in the art can clearly understand that reference can be made to the corresponding procedure in the foregoing method embodiments for the specific working procedures of the system, the modules and the units described above, which will not be described in detail here for convenience and conciseness of the description. It should be understood that the protection limiting condition of the present disclosure is not limited to this. Any person skilled in the art can easily think of various equivalent modifications or replacements within the technical limiting condition disclosed in the present disclosure. These modifications or replacements should all be encompassed in the protection limiting condition of the present disclosure.

What is claimed is:

1. An image processing method, comprising:
   acquiring a three-dimensional (3D) model and original texture images of an object, wherein the original texture images are acquired by an imaging device;
   determining a mapping relationship between the 3D model and the original texture images of the object;
   determining, among the original texture images, a subset of texture images associated with a first perspective of the imaging device;
   splicing the subset of texture images into a spliced texture image corresponding to the first perspective; and
   mapping the spliced texture image to the 3D model according to the mapping relationship.

2. The image processing method according to claim 1, wherein determining, among the original texture images, the subset of texture images associated with the first perspective of the imaging device further comprises:
   acquiring a polygonal patch of the 3D model as a patch to be processed;
   obtaining a normal vector of the patch to be processed;
   in response to an included angle between an incident ray of the imaging device and the normal vector of the patch to be processed meeting a threshold condition, determining the included angle as the first perspective.

3. The image processing method according to claim 1, wherein splicing the subset of texture images into a spliced texture image corresponding to the first perspective further comprises:
   determining an overlapping region of the texture images in the subset as a splicing region of the subset; and
   texture-blending the splicing region to obtain the spliced texture image corresponding to the first perspective.

4. The image processing method according to claim 3, wherein texture-blending the splicing region to obtain the spliced texture image corresponding to the first perspective further comprises:
   determining a sharpness function of the images in the subset;
   determining an integrity function of the images in the subset based on a relationship between integrity of the images in the subset and an area of the splicing region; and
   texture-blending the splicing region based on the sharpness function and the integrity function.

5. The image processing method according to claim 1, further comprising:
   generating a spliced texture image of a second perspective of the imaging device; and
   generating a texture model of the 3D model based on the spliced texture images of the first perspective and the second perspective.

6. The image processing method according to claim 5, further comprising:
   performing light equalization processing on the texture model.

7. An image processing apparatus, comprising:
   a memory storing a set of instructions; and
   at least one processor configured to execute the set of instructions to cause the image processing apparatus to:
   acquire a three-dimensional (3D) model and original texture images of an object, wherein the original texture images are acquired by an imaging device;
   determine a mapping relationship between the 3D model and the original texture images of the object;
   determine, among the original texture images, a subset of texture images associated with a first perspective of the imaging device;
   splice the subset of texture images into a spliced texture image corresponding to the first perspective; and
   map the spliced texture image to the 3D model according to the mapping relationship.

8. The image processing apparatus according to claim 7, wherein the at least one processor is further configured to execute the set of instructions to cause the image processing apparatus to:
   acquire a polygonal patch of the 3D model as a patch to be processed;
   obtain a normal vector of the patch to be processed;
   in response to an included angle between an incident ray of the imaging device and the normal vector of the patch to be processed meeting a threshold condition, determine the included angle as the first perspective.

9. The image processing apparatus according to claim 7, wherein the at least one processor is further configured to execute the set of instructions to cause the image processing apparatus to:
   determine an overlapping region of the texture images in the subset as a splicing region of the subset; and texture-blend the splicing region to obtain the spliced texture image corresponding to the first perspective.

10. The image processing apparatus according to claim 9, wherein the at least one processor is further configured to execute the set of instructions to cause the image processing apparatus to:
   determine a sharpness function of the images in the subset;
   determine an integrity function of the images in the subset based on a relationship between integrity of the images in the subset and an area of the splicing region; and
   texture-blend the splicing region based on the sharpness function and the integrity function.

11. The data processing apparatus according to claim 7, wherein the at least one processor is further configured to execute the set of instructions to cause the image processing apparatus to:
   generate a spliced texture image of a second perspective of the imaging device; and
   generate a texture model of the 3D model based on the spliced texture images of the first perspective and the second perspective.

12. The data processing apparatus according to claim 11, wherein the at least one processor is further configured to execute the set of instructions to cause the image processing apparatus to:
   perform light equalization processing on the texture model.

13. A non-transitory computer readable medium that stores a set of instructions that is executable by at least one processor of a computer system to cause the computer system to perform an image processing method, the method comprising:
   acquiring a three-dimensional (3D) model and original texture images of an object, wherein the original texture images are acquired by an imaging device;
   determining a mapping relationship between the 3D model and the original texture images of the object;
   determining, among the original texture images, a subset of texture images associated with a first perspective of the imaging device;
   splicing the subset of texture images into a spliced texture image corresponding to the first perspective; and
   mapping the spliced texture image to the 3D model according to the mapping relationship.

14. The non-transitory computer readable medium according to claim 13, wherein determining, among the original texture images, the subset of texture images associated with the first perspective of the imaging device further comprises:
   acquiring a polygonal patch of the 3D model as a patch to be processed;
   obtaining a normal vector of the patch to be processed;
   in response to an included angle between an incident ray of the imaging device and the normal vector of the patch to be processed meeting a threshold condition, determining the included angle as the first perspective.

15. The non-transitory computer readable medium according to claim 13, wherein splicing the subset of texture images into a spliced texture image corresponding to the first perspective further comprises:
   determining an overlapping region of the texture images in the subset as a splicing region of the subset; and
   texture-blending the splicing region to obtain the spliced texture image corresponding to the first perspective.

16. The non-transitory computer readable medium according to claim 15, wherein texture-blending the splicing region to obtain the spliced texture image corresponding to the first perspective further comprises:
   determining a sharpness function of the images in the subset;
   determining an integrity function of the images in the subset based on a relationship between integrity of the images in the subset and an area of the splicing region; and
   texture-blending the splicing region based on the sharpness function and the integrity function.

17. The non-transitory computer readable medium according to claim 13, wherein the set of instructions is further executable by the at least one processor of the computer system to cause the computer system to:
   generate a spliced texture image of a second perspective of the imaging device; and
   generate a texture model of the 3D model based on the spliced texture images of the first perspective and the second perspective.

18. The non-transitory computer readable medium according to claim 17, wherein the set of instructions is further executable by the at least one processor of the computer system to cause the computer system to:
   perform light equalization processing on the texture model.

* * * * *